(12) United States Patent
Jayaram

(10) Patent No.: US 12,363,564 B2
(45) Date of Patent: Jul. 15, 2025

(54) DETERMINING A CAUSE OF AN ISSUE ASSOCIATED WITH A WIRELESS TELECOMMUNICATION NETWORK

(71) Applicant: T-Mobile USA, Inc., Bellevue, WA (US)

(72) Inventor: Prabha Jayaram, Cranbury, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 462 days.

(21) Appl. No.: 17/965,603

(22) Filed: Oct. 13, 2022

(65) Prior Publication Data

US 2024/0129760 A1   Apr. 18, 2024

(51) Int. Cl.
*H04W 24/04* (2009.01)
*H04W 24/10* (2009.01)

(52) U.S. Cl.
CPC ........... *H04W 24/04* (2013.01); *H04W 24/10* (2013.01)

(58) Field of Classification Search
None
See application file for complete search history.

(56) References Cited

U.S. PATENT DOCUMENTS

| | | |
|---|---|---|
| 6,327,677 B1 | 12/2001 | Garg et al. |
| 7,280,988 B2 | 10/2007 | Helsper et al. |
| 7,694,143 B2 | 4/2010 | Karimisetty et al. |
| 7,908,076 B2 | 3/2011 | Downs et al. |
| 8,041,996 B2 | 10/2011 | Rathunde et al. |
| 8,051,202 B2 | 11/2011 | Rahman et al. |
| 8,095,974 B2 | 1/2012 | Aaron |
| 8,166,352 B2 | 4/2012 | Harnois |
| 8,380,648 B2 | 2/2013 | Matson et al. |
| 8,407,170 B2 | 3/2013 | Harrison et al. |
| 8,418,249 B1 | 4/2013 | Nucci et al. |
| 8,738,972 B1 | 5/2014 | Bakman et al. |
| 8,812,586 B1 | 8/2014 | Kulkarni et al. |
| 8,890,676 B1 | 11/2014 | Heath |
| 9,276,821 B2 | 3/2016 | Basak |
| 9,336,259 B1 | 5/2016 | Kane |

(Continued)

FOREIGN PATENT DOCUMENTS

| | | | |
|---|---|---|---|
| CN | 106802643 A | 6/2017 | |
| CN | 107430619 A | 12/2017 | |

(Continued)

*Primary Examiner* — Angela Nguyen
(74) *Attorney, Agent, or Firm* — Perkins Coie LLP

(57) ABSTRACT

The system receives multiple alarms indicating the issue associated with the network and obtains multiple categories associated with the multiple alarms. The category indicates a component associated with the network. Based on the multiple categories, the system creates a correlation signature associated with the multiple alarms. The system obtains historical data including a historical correlation signature that is the same as the correlation signature, a cause associated with the historical correlation signature, and an indication of accuracy associated with the cause. The system determines whether the indication of accuracy satisfies a first criterion. Upon determining that the indication of accuracy satisfies the first criterion, the system makes a prediction that the cause associated with the multiple alarms indicating the issue is the same as the cause associated with the historical correlation signature.

20 Claims, 9 Drawing Sheets

(56) References Cited

U.S. PATENT DOCUMENTS

| | | |
|---|---|---|
| 9,355,477 B2 | 5/2016 | Ashley et al. |
| 9,628,354 B2 | 4/2017 | Ogielski et al. |
| 9,629,566 B2 | 4/2017 | Gilham et al. |
| 9,660,862 B2 | 5/2017 | Ko et al. |
| 9,934,518 B2 | 4/2018 | Enstrom et al. |
| 10,110,385 B1 | 10/2018 | Rush et al. |
| 10,346,851 B1 | 7/2019 | Kapoor et al. |
| 10,354,197 B2 | 7/2019 | Bandara |
| 10,438,296 B2 | 10/2019 | Dintenfass et al. |
| 10,469,497 B2 | 11/2019 | Yedidi et al. |
| 10,469,603 B2 | 11/2019 | Abbondanzio et al. |
| 10,496,085 B2 | 12/2019 | Cheng et al. |
| 10,600,055 B2 | 3/2020 | Durney et al. |
| 10,695,600 B2 | 6/2020 | Moffa |
| 10,708,795 B2 | 7/2020 | Tapia |
| 10,753,677 B2 | 8/2020 | Suraganda Narayana et al. |
| 10,754,310 B2 | 8/2020 | Ide |
| 10,797,938 B2 | 10/2020 | Tiwari et al. |
| 10,812,317 B1 | 10/2020 | Kurtz et al. |
| 10,860,451 B1 | 12/2020 | Murthy et al. |
| 10,873,533 B1 | 12/2020 | Ismailsheriff et al. |
| 10,921,759 B2 | 2/2021 | Ma et al. |
| 10,997,609 B1 | 5/2021 | Wang et al. |
| 11,042,461 B2 | 6/2021 | Lin |
| 11,055,861 B2 | 7/2021 | Nazari et al. |
| 11,115,406 B2 | 9/2021 | Kursun |
| 11,212,162 B2 | 12/2021 | Qi et al. |
| 11,271,795 B2 | 3/2022 | Bhalla et al. |
| 11,271,796 B2 | 3/2022 | Tapia et al. |
| 11,321,449 B2 | 5/2022 | Kursun |
| 11,329,773 B2 | 5/2022 | Lei et al. |
| 11,424,039 B1 | 8/2022 | Modi et al. |
| 2002/0170002 A1 | 11/2002 | Steinberg et al. |
| 2004/0057536 A1 | 3/2004 | Kasper et al. |
| 2005/0262354 A1 | 11/2005 | Komano |
| 2008/0103847 A1 | 5/2008 | Sayal et al. |
| 2010/0211192 A1 | 8/2010 | Stluka et al. |
| 2011/0197071 A1 | 8/2011 | Wolcott et al. |
| 2012/0254208 A1 | 10/2012 | Duvoisin |
| 2014/0172551 A1 | 6/2014 | Desai et al. |
| 2014/0249934 A1 | 9/2014 | Subramanian et al. |
| 2017/0284903 A1 | 10/2017 | Anderson et al. |
| 2019/0007282 A1* | 1/2019 | Hsieh .................. G06F 11/34 |
| 2020/0134074 A1 | 4/2020 | Mankovskii et al. |
| 2020/0158810 A1 | 5/2020 | Zhang et al. |
| 2020/0228391 A1* | 7/2020 | Ajmera ................ H04L 41/142 |
| 2020/0382361 A1 | 12/2020 | Chandrasekhar et al. |
| 2021/0014103 A1 | 1/2021 | Zhang et al. |
| 2021/0042270 A1 | 2/2021 | Shi et al. |
| 2021/0367830 A1 | 11/2021 | Jain et al. |
| 2021/0397495 A1 | 12/2021 | Prakash et al. |
| 2021/0399972 A1 | 12/2021 | Nguyen et al. |
| 2022/0150104 A1 | 5/2022 | Mohan et al. |
| 2022/0157095 A1 | 5/2022 | Wennerblom |
| 2022/0190940 A1 | 6/2022 | Zaifman et al. |
| 2022/0191712 A1 | 6/2022 | Shaw et al. |
| 2022/0248250 A1 | 8/2022 | Saluja et al. |
| 2023/0059360 A1* | 2/2023 | Lamba ............. H04W 28/0268 |

FOREIGN PATENT DOCUMENTS

| | | |
|---|---|---|
| CN | 107742131 A | 2/2018 |
| CN | 106941423 B | 6/2018 |
| CN | 109344923 A | 2/2019 |
| CN | 104636079 B | 7/2019 |
| CN | 105221356 B | 7/2019 |
| CN | 110300011 A | 10/2019 |
| CN | 111199398 A | 5/2020 |
| CN | 111199489 A | 5/2020 |
| CN | 111726248 A | 9/2020 |
| CN | 107548568 B | 10/2020 |
| CN | 111858120 A | 10/2020 |
| CN | 111917705 A | 11/2020 |
| CN | 112204914 A | 1/2021 |
| CN | 112314024 A | 2/2021 |
| CN | 108009040 B | 5/2021 |
| CN | 113282461 A | 8/2021 |
| CN | 113362064 A | 9/2021 |
| CN | 113708977 A | 11/2021 |
| CN | 112052151 B | 2/2022 |
| CN | 109617745 B | 3/2022 |
| CN | 114095725 B | 5/2022 |
| CN | 112202584 B | 7/2022 |
| DE | 10134126 A1 | 1/2003 |
| DE | 102005032731 A1 | 1/2007 |
| DE | 102019101225 A1 | 7/2019 |
| DE | 102019133197 A1 | 6/2020 |
| DE | 102020100863 A1 | 7/2020 |
| DE | 102020103633 A1 | 10/2020 |
| DE | 202018006510 U1 | 10/2020 |
| DE | 102020208776 A1 | 4/2021 |
| EP | 2731272 A1 | 5/2014 |
| EP | 3134849 A1 | 3/2017 |
| EP | 3304090 A1 | 4/2018 |
| EP | 3123704 B1 | 4/2019 |
| EP | 3299919 B1 | 7/2019 |
| EP | 3534689 A1 | 9/2019 |
| EP | 3542331 A1 | 9/2019 |
| EP | 2651052 B1 | 5/2020 |
| EP | 3757843 A1 | 12/2020 |
| EP | 3761561 A1 | 1/2021 |
| EP | 3769304 A1 | 1/2021 |
| EP | 3542298 B1 | 8/2022 |
| JP | 2004535018 A | 11/2004 |
| JP | 2005521331 A | 7/2005 |
| JP | 2009503976 A | 1/2009 |
| JP | 2009516301 A | 4/2009 |
| JP | 2013501478 A | 1/2013 |
| JP | 2013537390 A | 9/2013 |
| JP | 5442867 B2 | 12/2013 |
| JP | 6126732 B1 | 4/2017 |
| JP | 6147309 B2 | 5/2017 |
| JP | 6166253 B2 | 6/2017 |
| JP | 2017520975 A | 7/2017 |
| JP | 2018500709 A | 1/2018 |
| JP | 2018511118 A | 4/2018 |
| JP | 6560128 B2 | 7/2019 |
| JP | 2019527897 A | 10/2019 |
| JP | 2020511715 A | 4/2020 |
| JP | 2020517003 A | 6/2020 |
| JP | 6739673 B1 | 7/2020 |
| JP | 2020522044 A | 7/2020 |
| JP | 2020184349 A | 11/2020 |
| JP | 2020533726 A | 11/2020 |
| JP | 6994869 B2 | 12/2021 |
| KR | 20000073314 A | 12/2000 |
| KR | 100408982 B1 | 12/2003 |
| KR | 100528792 B1 | 11/2005 |
| KR | 20100017637 A | 2/2010 |
| KR | 100992373 B1 | 11/2010 |
| KR | 101148969 B1 | 5/2012 |
| KR | 101849920 B1 | 4/2018 |
| KR | 20180041053 A | 4/2018 |
| KR | 101849908 B1 | 5/2018 |
| KR | 101890587 B1 | 8/2018 |
| KR | 101890584 B1 | 9/2018 |
| WO | 2007030869 A1 | 3/2007 |
| WO | 2012125135 A1 | 9/2012 |
| WO | 2013074140 A1 | 5/2013 |
| WO | 2015066921 A1 | 5/2015 |
| WO | 2018049290 A1 | 3/2018 |
| WO | 2019067627 A1 | 4/2019 |
| WO | 2019158690 A1 | 8/2019 |
| WO | 2020132137 A1 | 6/2020 |
| WO | 2020182051 A1 | 9/2020 |
| WO | 2020201926 A1 | 10/2020 |
| WO | 2020215237 A1 | 10/2020 |
| WO | 2020215505 A1 | 10/2020 |
| WO | 2020238810 A1 | 12/2020 |
| WO | 2020256616 A1 | 12/2020 |
| WO | 2021017306 A1 | 2/2021 |
| WO | 2021136872 A1 | 7/2021 |

(56) References Cited

FOREIGN PATENT DOCUMENTS

| WO | 2021196541 A1 | 10/2021 |
| WO | 2021216479 A1 | 10/2021 |
| WO | 2021231198 A1 | 11/2021 |

* cited by examiner

| Alarm Classification | Acronym |
|---|---|
| Administrative | Ad |
| Antenna | An |
| Battery | Ba |
| Clock | Cl |
| Environmental | En |
| Hardware | Ha |
| Fire | Fi |
| Performance | Pe |
| Power | Po |
| Radio | Ra |
| Regulatory | Re |
| RF | Rf |
| Security | Se |
| Software | So |
| Sync | Sy |
| Transport | Tr |

*FIG. 4*

| Alarm ID | Alarm Name | Classification | Correlation Signature | Causation Signature | Cause Prediction | Incident or TT# |
|---|---|---|---|---|---|---|
| 1 | Alarm 1 | Environment 510 | En 505 | | | TT 123456 |
| 2 | Alarm 2 | Hardware 520 | EnHa 515 | | | TT 123456 |
| 3 | Alarm 3 | Performance 530 | EnHaPe 525 | | | TT 123456 |
| 5 | Alarm 4 | Transport | EnHaPeTr 535 | | | TT 123456 |
| 6 | Alarm 5 | Other | EnHaPeTr | | | TT 123456 |
| 7 | Alarm 6 | Other 540 | EnHaPeTr 545 | | | TT 123456 |
| 8 | Alarm 7 | Performance | EnHaPeTr | | | TT 123456 |
| 9 | Alarm 8 | Other | EnHaPeTr | | | TT 123456 |
| 10 | Alarm 9 | Other | EnHaPeTr | HaTrPeEn | | TT 123456 |

*FIG. 5A*

| Correlation Signature | Causation Signature | Cause | Predicted Cause | # of tickets (per month) | %accuracy |
|---|---|---|---|---|---|
| EnHaPeTr | HaTrPeEn | Hardware | Hardware | 7273 | 82% |
| AdPoTrPe | PoTrPe | Maintenance | Maintenance | 5539 | 99% |
| HaPeSo | | Hardware | | 8183 | 54% |
| PeTrSo | SoTrPe | Software | | 320 | 16% |
| EnHaPeTr | HaTrPeEn | Environment | | ? | 9% |

*FIG. 5B*

DETERMINING A CAUSE OF AN ISSUE ASSOCIATED WITH A WIRELESS TELECOMMUNICATION NETWORK

BACKGROUND

Wireless telecommunication networks are complex systems including many interconnected components. An issue can arise with component A that propagates through the network to components directly and indirectly connected with component A. At that point many network components may raise alarms, but the root cause, namely the problem with component A, can be difficult to diagnose. Consequently, time to resolution is long, and the process of resolving the problem involves many unnecessary attempts, which affect the operation and efficiency of the wireless telecommunication network.

BRIEF DESCRIPTION OF THE DRAWINGS

Detailed descriptions of implementations of the present invention will be described and explained through the use of the accompanying drawings.

FIG. 4 shows the various categories to which the alarm can belong.

FIGS. 5A-5B show various components of the system including correlation signature, causation signature, cause, and accuracy.

Figure 1:
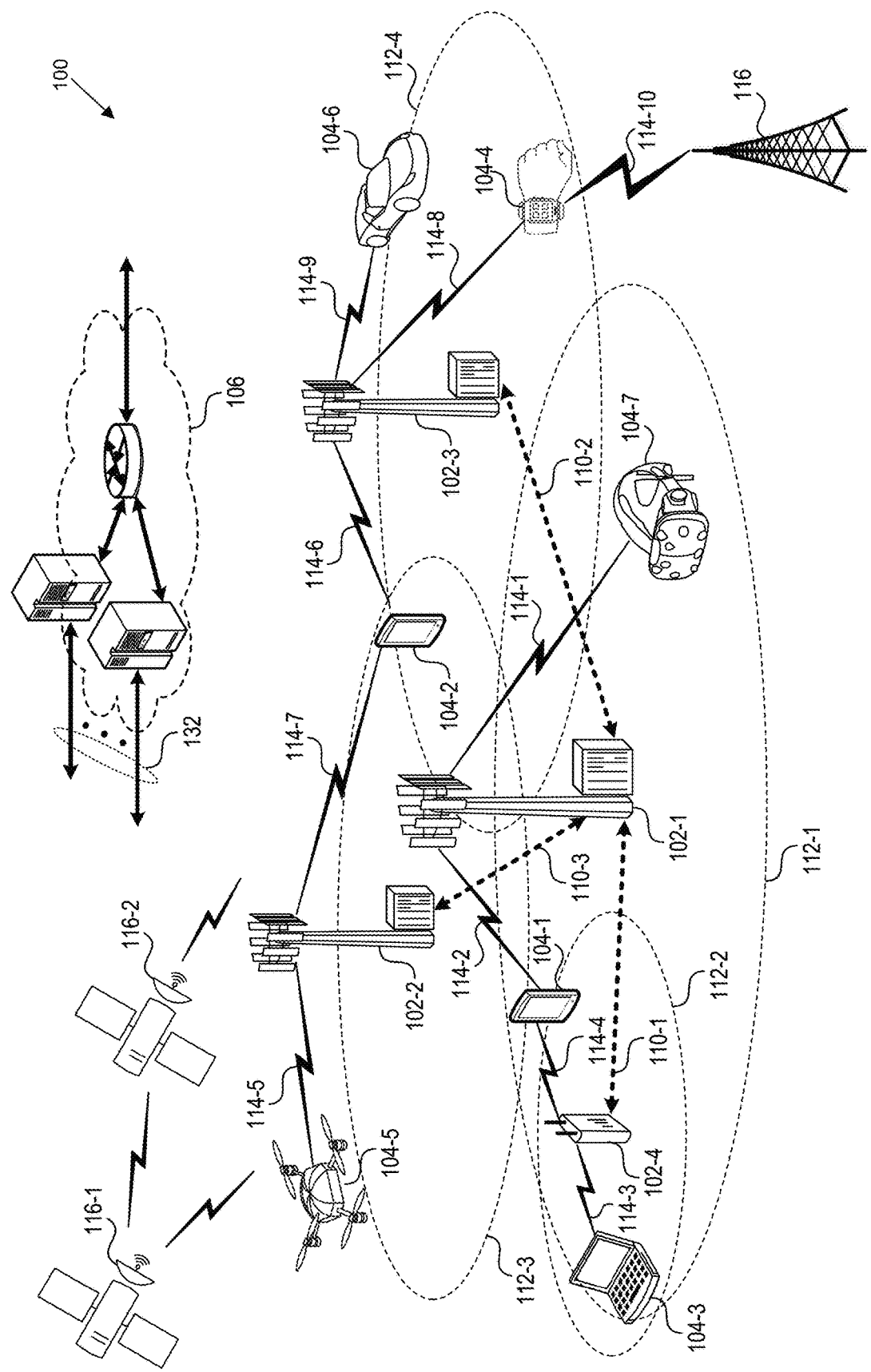
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to determine a cause of an issue associated with a wireless telecommunication network. The system can receive multiple alarms indicating the issue associated with the wireless telecommunication network. The system can obtain multiple categories associated with the multiple alarms, where a single alarm corresponds to a single category. The category indicates a component associated with the wireless telecommunication network such as hardware, software, antenna, battery, clock, configuration, transport, radio frequency, etc. The system can create a correlation signature associated with the multiple alarms. The correlation signature includes an indication of the multiple categories associated with the multiple alarms in a chronological order in which the multiple alarms are raised. The indication can be a shorthand for the category associated with the alarm. The indication can exclude duplicate categories, such as when different alarms are associated with the same category.

The system obtains historical data including a historical correlation signature that is the same as the correlation signature, a cause associated with the historical correlation signature, and an accuracy indication representing how frequently resolving the cause resolved the multiple alarms. The system can determine whether the accuracy indication is above a first predetermined threshold, such as 50% or 75%. Upon determining that the indication is above the first predetermined threshold, the system can make a prediction that the cause associated with the multiple alarms indicating the issue is the same as the cause associated with the historical correlation signature. The system can create a ticket with the predicted cause and can also include instructions on how to fix the issue.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits per second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
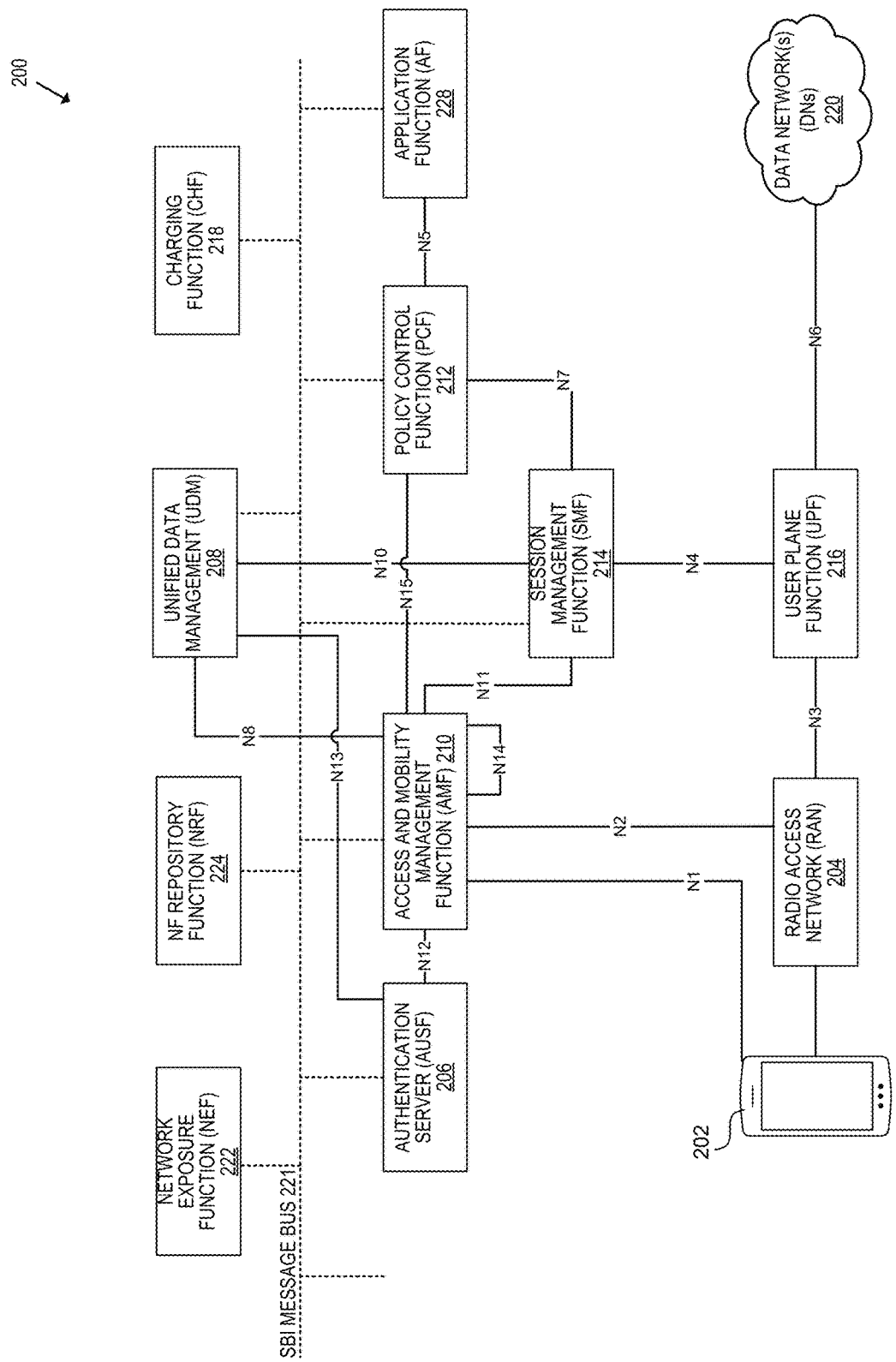
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), providing authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF 226.

Figure 3:
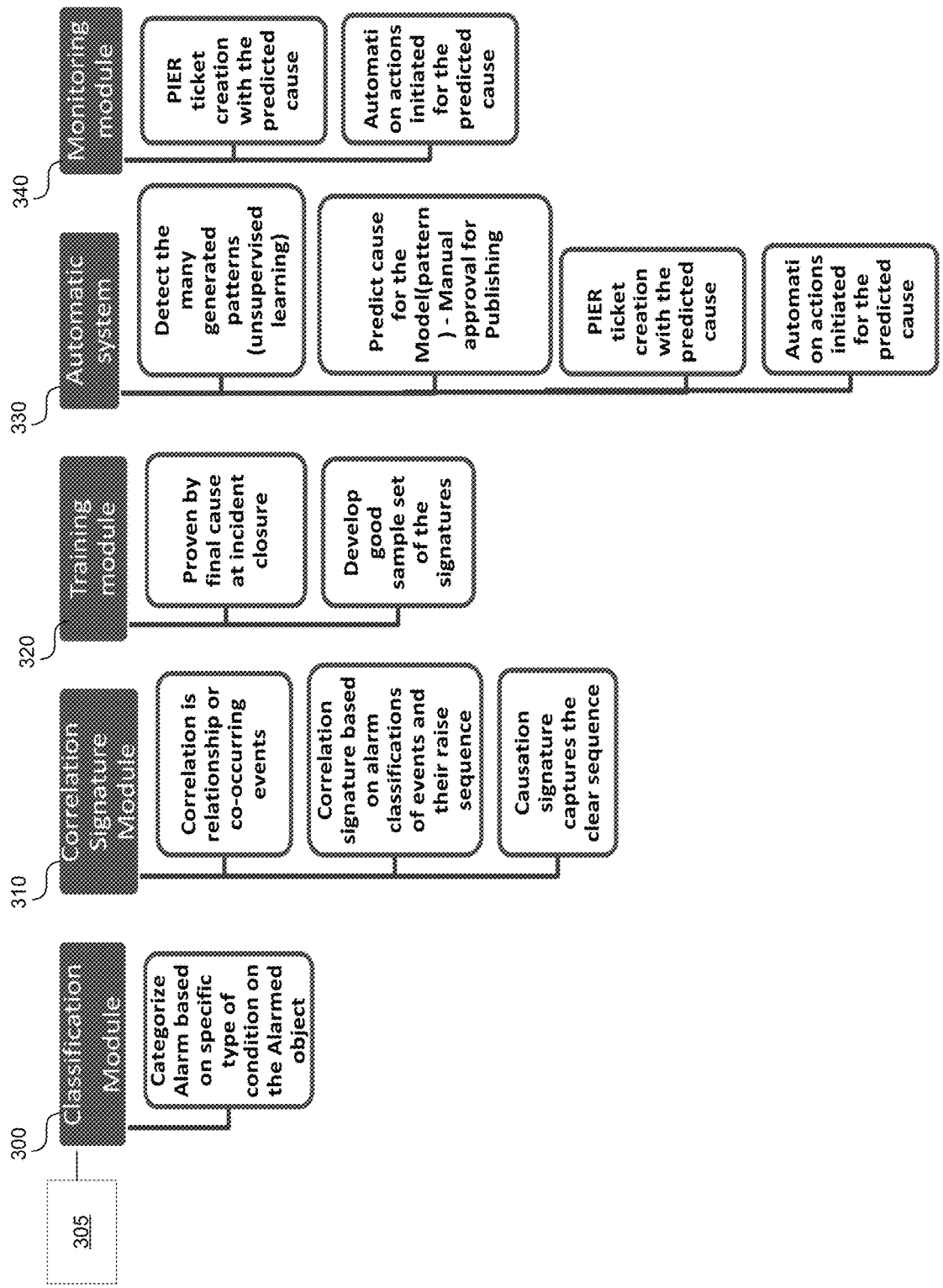
FIG. 3 shows a system to determine a cause of an issue associated with the network.

Determining a Cause of an Issue Associated with a Wireless Telecommunication Network FIG. 3 shows a system to determine a cause of an issue associated with the network 100 in FIG. 1. The classification module 300 obtains a category, e.g., classification, of an alarm 305 generated by a component of the network 100.

FIG. 4 shows the various categories to which the alarm 305 in FIG. 3 can belong. Category 400, administrative, indicates that a configuration associated with the component has changed. Category 410, antenna, indicates that the alarm is associated with an antenna, such as a smart antenna at a cell site. Category 420, battery, indicates that the alarm is associated with the battery, such as a backup battery at a cell site. Category 430, clock, indicates that the alarm is associated with the clock. Category 440, environmental, can indicate that something in the environment has changed, such as a temperature rising, which is causing a processor to overheat. Category 450, hardware, and category 460, software, indicate that the alarm is associated with hardware or software, respectively. The alarm classifications shown in FIG. 4 are exemplary, and additional alarm classifications can be created. Column 470 shows the various shorthand codes for the various categories 400-460.

Category fire describes physical security of the network 100 in FIG. 1. Physical security relates to the situation of people directly harming a network 100 site through either theft or vandalism. Physical security is paramount for telecommunications industry and one of the biggest challenges that network 100 operators have to face while managing their networks of base stations. Theft and vandalism are common physical threats that network 100 operators have to prepare for when managing their cell base stations. Some locations and hardware are equipped with external sensors/detectors that can detect presence of smoke or flame. Flame detector can detect heat, smoke, and fire. These devices can also detect fire according to the air temperature and air movement. Air Sampling Smoke Detectors are capable of detecting a fire at its smallest point. Air Sampling Smoke Detectors actively pulls room air through a piping network to its detection chamber where it can detect the presence of particles that are created in the very early stages of combustion, even before smoke is visible.

Category regulatory describes devices added to the network 100 to satisfy Federal Communication Commission (FCC) requirements. A tower light is an example of FCC regulatory condition. The tower light must be observable at least once every 24 hours—either visually or through an automatic indicator. The network 100 must maintain an automatic alarm system to detect any light failure.

Category sync whether the components of the network 100 are connected to the management system. Upon loss of connectivity to the management systems, some base transceiver stations (BTSs) create an alarm to state that their objects may be out of sync resulting from a loss of connectivity to neighboring connected devices for a period of time. Such alarms would be categorized as "sync" and need initiation of a "sync" to restore normal operations.

Category transport includes alarms that indicate loss of connectivity by a transport vendor. The BTS is connected via a landline to a radio network controller (RNC). The RNC manages several base transceiver stations. The landline connectivity is provided by the transport vendor that makes ethernet circuits available. Internet protocol connectivity is enabled by these transport circuits (typically leased from the transport vendor).

Returning to FIG. 3, correlation signature module 310 can create a correlation signature associated with the alarm 305 where the correlation signature includes an indication of the multiple categories associated with the multiple alarms, as described in this application. The correlation signature can be created in a chronological order in which the alarms were raised. The correlation signature module 310 can also create a causation signature that indicates an order in which the alarms were resolved. The causation signature can thus indicate a root cause of an issue because the first alarm that was cleared was likely the root cause of the issue. Correlation signature helps identify most typical scenarios. A complex scenario would require topology, correlation signature and causation signature, and possibly more, to detect the nuanced patterns. Causation signature can help with mitigation tasks to be initiated earlier if the root cause condition is cleared. This can enable faster mitigation.

The training module 320 can obtain historical data including correlation signatures, final causes determined to be the root cause of the correlation signature, as well as the accuracy of the root cause, namely, how frequently the root cause is associated with the correlation signature. The training module 320 can train an automatic system such as a machine learning model (ML) or an artificial intelligence (AI) to receive a correlation signature and determine the root cause based on the correlation signature. In addition, the training module 320 can clean the historical data to generate a clean set of training data.

The automatic system 330 can be published in production. The automatic system 330 is trained to receive the correlation signature and predict the root cause for the correlation signature. Once the automatic system 330 predicts the root cause, the automatic system can create a ticket including the predicted root cause. The ticket can further indicate which automatic actions need to be initiated to resolve the predicted root cause. The automatic action can include restarting a component, reconfiguring the component, reinstalling a software associated with the component, etc.

The monitoring module 340 can supervise the performance of the automatic system 330. For example, the monitoring module 340 can measure how accurately the automatic system 330 predicts the root cause. If the prediction accuracy falls below a predetermined threshold, such as 50% or 75%, the monitoring module 340 can generate a notification or warning that the automatic system 330 is underperforming. In addition, the monitoring module 340 can determine whether the same correlation signature keeps occurring frequently, even though the correlation signature has been previously cleared. In that case, the monitoring module 340 can generate a notification that the automatic system 330 is not effectively determining the root cause and that the particular correlation signature is chronic.

FIGS. 5A-5B show various components of the system including correlation signature, causation signature, cause, and accuracy. The various components can be used as a training data set for the automatic system 330 in FIG. 3 and/or as input to the automatic system.

FIG. 5A shows multiple alarms 1-3, 5-10 that the components of network 100 in FIG. 1 generate. Classifications, e.g., categorizations, 500, 510, 520, 530, 540 are classifications of the multiple alarms 1-3, 5-10 into the categories shown in FIG. 4. The correlation signatures 505, 515, 525, 535, 545 are generated based on the classifications 500, 510, 520, 530, 540. Specifically, a shorthand 470 in FIG. 4 for the classifications 500, 510, 520, 530, 540 is added to the correlation signatures 505, 515, 525, 535, 545 as the new classifications become available. The ordering of the category shorthand 470 in the correlation signatures 505, 515, 525, 535, 545 can be done according to the chronological order in which the multiple alarms 1-3, 5-10 occurred.

The correlation signatures 505, 515, 525, 535, 545 do not append the duplicate shorthand 470 for duplicate classifications 500, 510, 520, 530, 540. For example, if an alarm is classified into the same category, such as 520 and 540, the correlation signature 545 stays the same as the correlation signature 535 and does not append another "Pe" shorthand.

FIG. 5B shows correlation signatures 550, causation signatures, the causes 560, and the accuracy 570 of each cause. If the data in FIG. 5B is used as training data, the data can be obtained from a database storing historical information about correlation signatures, causes, and how accurately the causes reflected the root cause of the correlation signatures. During training, the automatic system 330 receives the correlation signature 550 and generates a predicted cause 580. The predicted cause 580 is compared to the cause 560 that has been entered into the database as the root cause associated with the correlation signature 550. The accuracy 570 reflects the accuracy of the predicted cause 580 compared to the cause 560. The training module 320 can keep the record of accuracy 570.

If the data in FIG. 5B is used as input to the automatic system 330, the automatic system receives the correlation signature 515 and generates a prediction about the cause 560. To determine whether to deploy the automatic system 330 to generate the predicted cause 580, and/or to determine whether to rely on the predicted cause 580, the processor can look at the accuracy 570. For example, if the incoming correlation signature is "HaPeSo" (reflecting alarms for hardware, performance and software, received chronologically in order), the processor can obtain the accuracy of predicting the root cause of the correlation signature "HaPeSo" in the training data. If the accuracy is below a predetermined threshold, the processor can determine not to deploy the automatic system 330 or to ignore the predicted cause 580 because the automatic system is unreliable. For example, the predetermined threshold can be 75%. In case of correlation signature HaPeSo, the accuracy of predicting the root cause is 54%. Thus, the processor does not employ the automatic system 330. As can be seen in FIG. 5B, when the accuracy, e.g., 82% or 99%, is above the predetermined threshold of 75%, the automatic system 330 generates the predicted cause 580, namely hardware and maintenance, respectively.

In addition, the training module 320 can keep a record of the number of tickets 590 having a particular correlation signature. The processor can also use the number of tickets 590 to determine whether to deploy the automatic system 330. Specifically, if the number of tickets is below a predetermined threshold, such as 100 tickets, the processor can determine that there is insufficient data to accurately determine the accuracy 570 of the automatic system 330. If the processor makes such a determination, the processor can choose to not deploy the automatic system 330.

Figure 6:
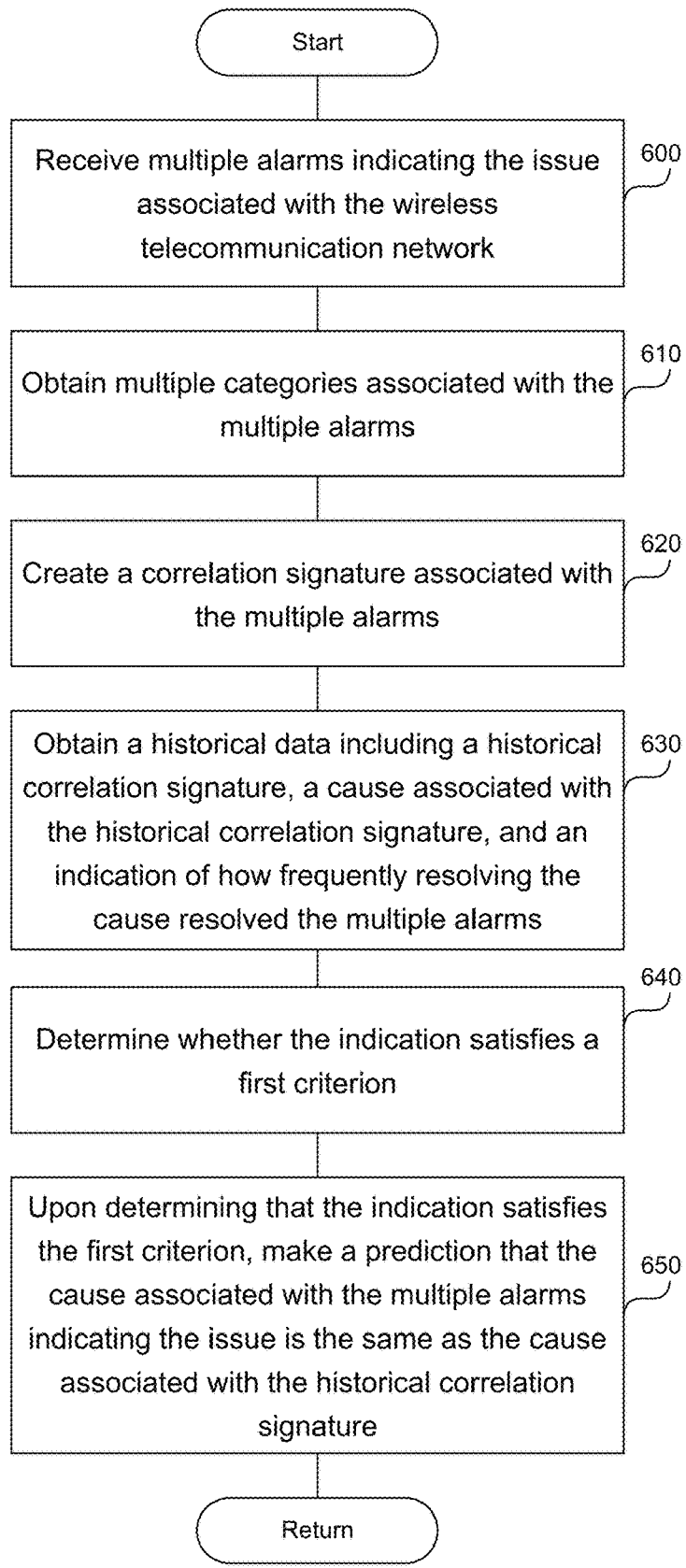
FIG. 6 is a flowchart of a method to determine a cause of an issue associated with a wireless telecommunication network.

FIG. 6 is a flowchart of a method to determine a cause of an issue associated with a wireless telecommunication network. In step 600, a hardware or software processor executing instructions described in this application can receive multiple alarms indicating the issue associated with the wireless telecommunication network. The alarms can include fault, configuration, accounting, performance, or security.

In step 610, the processor can obtain multiple categories, e.g., as shown in FIG. 4, associated with the multiple alarms, where a category among the multiple categories is associated with an alarm among the multiple alarms. The category can indicate a component associated with the wireless telecommunication network, such as antenna, battery, clock, radio frequency, hardware, software, etc., as shown in FIG. 4. The categories can be automatically or manually determined.

In step 620, the processor can create a correlation signature associated with the multiple alarms, where the correlation signature includes an indication of the multiple categories associated with the multiple alarms. The correlation signature can be generated in a chronological order in which the multiple alarms were raised. The indication can be a shorthand for the category associated with the alarm. The indication can exclude duplicate categories.

In step 630, the processor can obtain historical data including a historical correlation signature that is the same as the correlation signature, a cause associated with the historical correlation signature, and an indication of accuracy associated with the cause. The indication of accuracy can represent how frequently resolving the cause resolved the multiple alarms.

In step 640, the processor can determine whether the indication satisfies a first criterion. The first criterion can require that accuracy of the predicted cause be above a first predetermined threshold. For example, the first criterion can require that the accuracy be above the first predetermined threshold, such as 50% or 75%. The accuracy can represent a percentage of the time that resolving the predicted cause resolved the multiple alarms.

In step 650, upon determining that the indication satisfies the first criterion, the processor can make a prediction that the cause associated with the multiple alarms indicating the issue is the same as the cause associated with the historical correlation signature. The processor can create a ticket including the predicted cause. In addition, the processor can include in the ticket the automated steps to be taken to resolve the predicted cause.

The processor can train an automatic system to predict the cause. The processor can obtain multiple historical correlation signatures, multiple causes associated with the multiple historical correlation signatures, and multiple indications of accuracy associated with the multiple causes. The processor can create an automatic system to predict the causes associated with the multiple alarms based on the multiple historical correlation signatures and the multiple causes associated with the multiple historical correlation signatures. The automatic system can be AI/ML.

The processor can determine whether to employ the automatic system by determining whether an indication of accuracy among the multiple indications of accuracy associated with the multiple causes satisfies the first criterion, where the first criterion requires that the indication of accuracy exceed a predetermined threshold.

The processor can determine whether to deploy the automatic system based on a number of occurrences of the historical correlation signature. Specifically, the processor can obtain an indication of a number of occurrences of the historical correlation signature. The processor can determine whether the number of occurrences satisfies a second criterion. The second criterion can require that the number of occurrences of the historical correlation signature be above a second predetermined threshold, such as 100 occurrences. Upon determining that the number of occurrences does not satisfy the second criterion, the processor can avoid making the prediction. Upon determining that the number of occurrences satisfies the second criterion, the processor can make the prediction.

The processor can monitor the automatic system after deployment. The processor can obtain multiple historical correlation signatures, multiple causes associated with the multiple historical correlation signatures, and multiple indications of accuracy associated with the multiple causes. The processor can create an automatic system to predict multiple causes associated with a second multiplicity of alarms based on the multiple historical correlation signatures and the multiple causes associated with the multiple historical correlation signatures. The processor can receive multiple issues associated with the wireless telecommunication network. The processor can obtain the multiple causes generated by the automatic system in response to the multiple issues and a second multiplicity of causes indicating multiple final causes associated with closing of the multiple issues. The processor can determine a portion of the multiple causes matching the second multiplicity of causes. The processor can determine whether the portion of the multiple causes satisfies a third criterion. The third criterion can be the same as the first criterion, i.e., the third criterion can require that the accuracy of the predicted cause be above a predetermined threshold, such as 50% or 75%. Upon determining that the portion of the multiple causes does not satisfy the third criterion, the processor can generate a notification that the automatic system is performing unsatisfactorily. If the processor determines that the accuracy of the automatic system is above the predetermined threshold, the processor does not have to do anything.

Upon making the prediction, based on the cause, the processor can initiate an automatic action aimed at resolving the issue associated with the cause.

The processor can diagnose an alarm as a chronic alarm. The processor can receive an indication that an action was taken to resolve the issue based on the predicted cause. The processor can receive a second multiplicity of alarms the same as the multiple alarms, within a predetermined period, such as within an hour or a day. The processor can create a notification that the predicted cause is inaccurate.

The processor can also generate a causation signature. The processor can create a causation signature including an indication of the multiple categories associated with the multiple alarms in a chronological order associated with a resolution of the multiple alarms. An initial category in the causation signature can indicate a predicted cause associated with the multiple alarms. The initial category can be used to generate the multiple historical causes in the training data.

Figure 7:
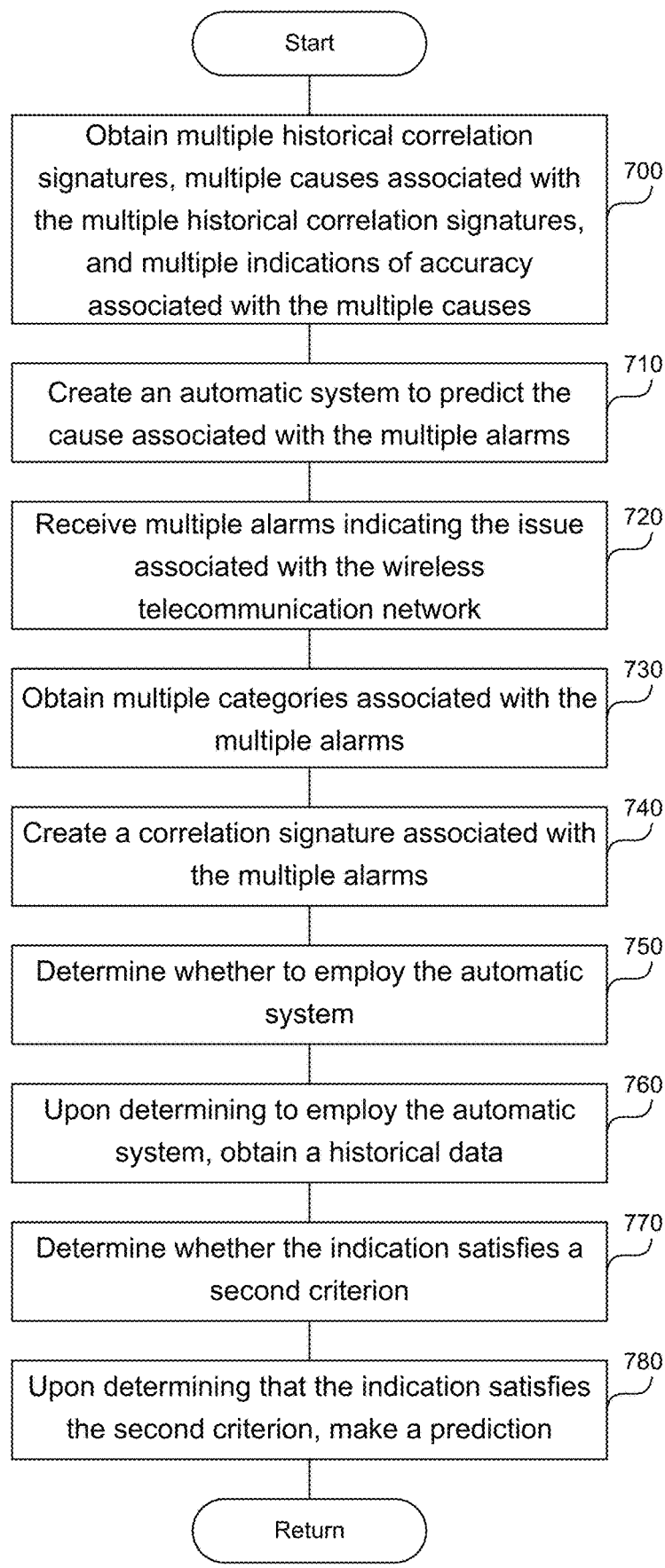
FIG. 7 shows a flowchart of steps performed by the system to determine a cause of an issue associated with a wireless telecommunication network.

FIG. 7 shows a flowchart of steps performed by the system to determine a cause of an issue associated with a wireless telecommunication network. In step 700, a training module can obtain multiple historical correlation signatures, multiple causes associated with the multiple historical correlation signatures, and multiple indications of accuracy associated with the multiple causes.

In step 710, the training module can create an automatic system to predict the cause associated with the multiple alarms based on the multiple historical correlation signatures and the multiple causes associated with the multiple historical correlation signatures. The automatic system can be AI and/or ML.

In step 720, a receiving module can receive multiple alarms indicating the issue associated with the wireless telecommunication network. The alarms can include fault, configuration, accounting, performance, or security.

In step 730, a classification module can obtain multiple categories associated with the multiple alarms, where a category among the multiple categories is associated with an alarm among the multiple alarms, and where the category indicates a component associated with the wireless telecommunication network. The classification module can obtain the multiple categories from a user, can automatically generate the multiple categories, or can obtain the multiple categories from another module.

In step 740, a correlation signature module can create a correlation signature associated with the multiple alarms, where the correlation signature includes an indication of the multiple categories associated with the multiple alarms. The correlation signature module can create the correlation signature in a chronological order associated with the multiple alarms, e.g., when the multiple alarms were raised. The indication can be a shorthand for the category, and duplicate categories can be excluded.

In step 750, a decision module can determine whether to employ the automatic system by determining whether an indication of accuracy among the multiple indications of accuracy associated with the multiple causes satisfies a first criterion. The first criterion can require that the indication of accuracy exceed a predetermined threshold.

In step 760, the automatic system, upon determining to employ the automatic system, can obtain historical data including a historical correlation signature, a cause associated with the historical correlation signature, and an indication of how frequently resolving the cause resolved the multiple alarms. The historical correlation signature can be the same as the correlation signature.

In step 770, the automatic system can determine whether the indication satisfies a second criterion. The second criterion can require that the percentage of time that resolving the cause resolved the multiple alarms exceeds the second predetermined threshold of 50% or 75%. The second criterion can be the same as the first criterion.

In step 780, upon determining that the indication satisfies the second criterion, the automatic system can make a prediction that the cause associated with the multiple alarms indicating the issue is the same as the cause associated with the historical correlation signature. The automatic system can also create a ticket with the predicted cause and can include steps to be performed to resolve the predicted cause.

The automatic system can obtain an indication of a number of occurrences of the historical correlation signature. The automatic system can determine whether the number of occurrences satisfies a third criterion. The third criterion can require that the number of occurrences of the historical correlation signature be above a third predetermined threshold, such as 100. Upon determining that the number of occurrences does not satisfy the third criterion, the automatic system can refrain from, e.g., avoid, making the prediction. Upon determining that the number of occurrences satisfies the third criterion, the automatic system can make the prediction.

A monitoring module can obtain multiple historical correlation signatures, multiple causes associated with the multiple historical correlation signatures, and multiple indications of accuracy associated with the multiple causes. The monitoring module can create an automatic system to predict multiple causes associated with a second multiplicity of alarms based on the multiple historical correlation signatures and the multiple causes associated with the multiple historical correlation signatures. The monitoring module can receive multiple issues associated with the wireless telecommunication network. The monitoring module can obtain the multiple causes generated by the automatic system in response to the multiple issues and a second multiplicity of causes indicating multiple final causes associated with closing of the multiple issues. The monitoring module can determine a portion of the multiple causes matching the second multiplicity of causes. The monitoring module can determine whether the portion of the multiple causes satisfies a third criterion. The third criterion can be the same as the first criterion and can require that the accuracy of the predicted cause be above a third predetermined threshold, such as 50% or 75%. Upon determining that the portion of the multiple causes does not satisfy the third criterion, the monitoring module can generate a notification that the automatic system is performing unsatisfactorily.

A resolution module can, upon making the prediction based on the cause, initiate an automatic action aimed at resolving the issue associated with the cause.

A monitoring module can receive an indication that an action was taken to resolve the issue based on the predicted cause. The monitoring module can receive a second multiplicity of alarms the same as the multiple alarms within a predetermined period, such as an hour, a day, or a week. The monitoring module can create a notification that the predicted cause is inaccurate.

The correlation signature module can create a causation signature including an indication of the multiple categories associated with the multiple alarms in a chronological order associated with a resolution of the multiple alarms. An initial category in the causation signature can indicate a potential cause associated with the multiple alarms, and can be used to generate the multiple historical causes used in training the automatic system.

Computer System

Figure 8:
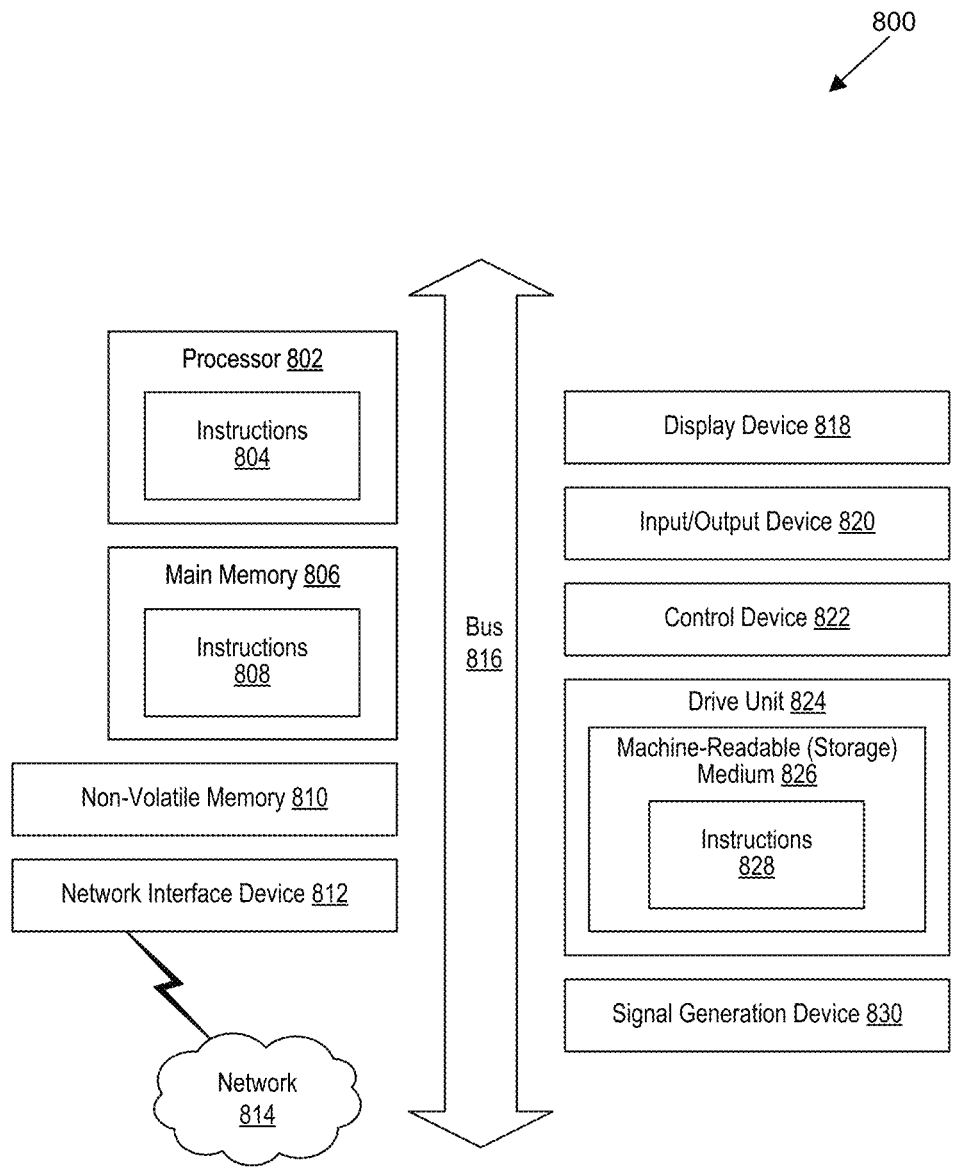
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the Figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC), or a distributed system such as a mesh of computer systems, or the computer system 800 can include one or more cloud components in one or more networks. Where appropriate, one or more computer systems 800 can perform operations in real-time, near real-time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. At least one non-transitory computer-readable storage medium storing instructions to determine a cause of an issue associated with a wireless telecommunication network, which, when executed by at least one data processor of a system, cause the system to:
   receive multiple alarms indicating the issue associated with the wireless telecommunication network;
   obtain multiple categories associated with the multiple alarms,
      wherein a category among the multiple categories is associated with an alarm among the multiple alarms, and,
      wherein the category indicates a hardware or software component in the wireless telecommunication network;
   create a correlation signature associated with the multiple alarms,
      wherein the correlation signature includes an indication of the multiple categories associated with the multiple alarms in a chronological order associated with the multiple alarms;
   obtain historical data including a historical correlation signature, a cause associated with the historical correlation signature, and an accuracy indication of how frequently resolving the cause resolved the multiple alarms,
      wherein the historical correlation signature matches the correlation signature;
   determine whether the accuracy indication is above a first predetermined threshold; and
   upon determining that the accuracy indication is above the first predetermined threshold, make a prediction that the cause associated with the multiple alarms indicating the issue is the same as the cause associated with the historical correlation signature.

2. The at least one non-transitory computer-readable storage medium of claim 1, comprising instructions to:
   obtain multiple historical correlation signatures, multiple causes associated with the multiple historical correlation signatures, and multiple indications of accuracy associated with the multiple causes;
   create an automatic system to predict multiple causes associated with a second multiplicity of alarms based on the multiple historical correlation signatures and the multiple causes associated with the multiple historical correlation signatures;
   receive multiple issues associated with the wireless telecommunication network;
   obtain the multiple causes generated by the automatic system in response to the multiple issues and a second multiplicity of causes indicating multiple final causes associated with closing of the multiple issues;
determine a portion of the multiple causes matching the second multiplicity of causes;
determine whether the portion of the multiple causes is above a third predetermined threshold; and
upon determining that the portion of the multiple causes is above the third predetermined threshold, generate a notification that the automatic system is performing unsatisfactorily.

3. The at least one non-transitory computer-readable storage medium of claim 1, comprising instructions to:
obtain multiple historical correlation signatures, multiple causes associated with the multiple historical correlation signatures, and multiple indications of accuracy associated with the multiple causes;
create an automatic system to predict the cause associated with the multiple alarms based on the multiple historical correlation signatures and the multiple causes associated with the multiple historical correlation signatures; and
determine whether to employ the automatic system by determining whether an indication of accuracy among the multiple indications of accuracy associated with the multiple causes is above the first predetermined threshold.

4. The at least one non-transitory computer-readable storage medium of claim 1, comprising instructions to:
obtain an indication of a number of occurrences of the historical correlation signature;
determine whether the number of occurrences is above a second predetermined threshold;
upon determining that the number of occurrences is not above the second predetermined threshold, avoid making the prediction; and
upon determining that the number of occurrences is above the second predetermined threshold, make the prediction.

5. The at least one non-transitory computer-readable storage medium of claim 1, comprising instructions to:
upon making the prediction, based on the cause, initiate an automatic action aimed at resolving the issue associated with the cause.

6. The at least one non-transitory computer-readable storage medium of claim 1, comprising instructions to:
receive an indication that an action was taken to resolve the issue based on the predicted cause;
receive a second multiplicity of alarms the same as the multiple alarms; and
create a notification that the predicted cause is inaccurate.

7. The at least one non-transitory computer-readable storage medium of claim 1, comprising instructions to:
create a causation signature including an indication of the multiple categories associated with the multiple alarms in a chronological order associated with a resolution of the multiple alarms,
wherein an initial category in the causation signature indicates a potential cause associated with the multiple alarms.

8. A system comprising:
at least one hardware processor; and
at least one non-transitory memory storing instructions, which, when executed by the at least one hardware processor, cause the system to:
receive multiple alarms associated with a technical issue in a wireless telecommunication network;
obtain multiple categories associated with the multiple alarms,
wherein a category among the multiple categories is associated with an alarm among the multiple alarms,
wherein the category indicates a component associated with the wireless telecommunication network;
create a correlation signature associated with the multiple alarms,
wherein the correlation signature includes an indication of the multiple categories associated with the multiple alarms;
obtain historical data including a historical correlation signature, a cause associated with the historical correlation signature, and an indication of accuracy associated with the cause,
wherein the historical correlation signature is the same as the correlation signature;
determine whether the indication of accuracy satisfies a first criterion; and
upon determining that the indication of accuracy satisfies the first criterion, make a prediction that the cause associated with the multiple alarms indicating the technical issue is the same as the cause associated with the historical correlation signature.

9. The system of claim 8, comprising instructions to:
obtain multiple historical correlation signatures, multiple causes associated with the multiple historical correlation signatures, and multiple indications of accuracy associated with the multiple causes;
create an automatic system to predict the cause associated with the multiple alarms based on the multiple historical correlation signatures and the multiple causes associated with the multiple historical correlation signatures; and
determine whether to employ the automatic system by determining whether the indication of accuracy among the multiple indications of accuracy associated with the multiple causes satisfies the first criterion,
wherein the first criterion requires that the indication of accuracy exceed a predetermined threshold.

10. The system of claim 8, comprising instructions to:
obtain an indication of a number of occurrences of the historical correlation signature;
determine whether the number of occurrences satisfies a second criterion;
upon determining that the number of occurrences does not satisfy the second criterion, avoid making the prediction; and
upon determining that the number of occurrences satisfies the second criterion, make the prediction.

11. The system of claim 8, comprising instructions to:
obtain multiple historical correlation signatures, multiple causes associated with the multiple historical correlation signatures, and multiple indications of accuracy associated with the multiple causes;
create an automatic system to predict multiple causes associated with a second multiplicity of alarms based on the multiple historical correlation signatures and the multiple causes associated with the multiple historical correlation signatures;
receive multiple issues associated with the wireless telecommunication network;
obtain the multiple causes generated by the automatic system in response to the multiple issues and a second multiplicity of causes indicating multiple final causes associated with closing of the multiple issues;
determine a portion of the multiple causes matching the second multiplicity of causes;
determine whether the portion of the multiple causes satisfies a third criterion; and
upon determining that the portion of the multiple causes does not satisfy the third criterion, generate a notification that the automatic system is performing unsatisfactorily.

12. The system of claim 8, comprising instructions to:
upon making the prediction, based on the cause, initiate an automatic action aimed at resolving the technical issue associated with the cause.

13. The system of claim 8, comprising instructions to:
receive an indication that an action was taken to resolve the technical issue based on the predicted cause;
receive a second multiplicity of alarms the same as the multiple alarms; and
create a notification that the predicted cause is inaccurate.

14. The system of claim 8, comprising instructions to:
create a causation signature including an indication of the multiple categories associated with the multiple alarms in a chronological order associated with a resolution of the multiple alarms,
wherein an initial category in the causation signature indicates a potential cause associated with the multiple alarms.

15. A system comprising:
a training module configured to:
obtain multiple historical correlation signatures, multiple causes associated with the multiple historical correlation signatures, and multiple indications of accuracy associated with the multiple causes, and
create an automatic system to predict a cause associated with multiple alarms based on the multiple historical correlation signatures and the multiple causes associated with the multiple historical correlation signatures;
a receiving module configured to receive the multiple alarms indicating an issue associated with a wireless telecommunication network;
a classification module configured to obtain multiple categories associated with the multiple alarms,
wherein a category among the multiple categories is associated with an alarm among the multiple alarms,
wherein the category indicates a component associated with the wireless telecommunication network;
a correlation signature module configured to create a correlation signature associated with the multiple alarms,
wherein the correlation signature includes an indication of the multiple categories associated with the multiple alarms;
a decision module configured to determine whether to employ the automatic system by determining whether a first indication of accuracy among the multiple indications of accuracy associated with the multiple causes satisfies a first criterion,
wherein the first criterion requires that the first indication of accuracy exceed a predetermined threshold; and
the automatic system configured to:
upon determining to employ the automatic system, obtain a historical data including a historical correlation signature, a cause associated with the historical correlation signature, and a second indication of accuracy associated with the cause,
wherein the historical correlation signature is the same as the correlation signature;
determine whether the second indication of accuracy associated with the cause a satisfies second criterion; and
upon determining that the second indication of accuracy satisfies the second criterion, make a prediction that the cause associated with the multiple alarms indicating the issue is the same as the cause associated with the historical correlation signature.

16. The system of claim 15, including the automatic system configured to:
obtain an indication of a number of occurrences of the historical correlation signature;
determine whether the number of occurrences satisfies a third criterion;
upon determining that the number of occurrences does not satisfy the third criterion, avoid making the prediction; and
upon determining that the number of occurrences satisfies the third criterion, make the prediction.

17. The system of claim 15, comprising a monitoring module configured to:
obtain multiple historical correlation signatures, multiple causes associated with the multiple historical correlation signatures, and multiple indications of accuracy associated with the multiple causes;
create an automatic system to predict multiple causes associated with a second multiplicity of alarms based on the multiple historical correlation signatures and the multiple causes associated with the multiple historical correlation signatures;
receive multiple issues associated with the wireless telecommunication network;
obtain the multiple causes generated by the automatic system in response to the multiple issues and a second multiplicity of causes indicating multiple final causes associated with closing of the multiple issues;
determine a portion of the multiple causes matching the second multiplicity of causes;
determine whether the portion of the multiple causes satisfies a third criterion; and
upon determining that the portion of the multiple causes does not satisfy the third criterion, generate a notification that the automatic system is performing unsatisfactorily.

18. The system of claim 15, comprising a resolution module configured to:
upon making the prediction, based on the cause, initiate an automatic action aimed at resolving the issue associated with the cause.

19. The system of claim 15, comprising a monitoring module configured to:
receive an indication that an action was taken to resolve the issue based on the predicted cause;
receive a second multiplicity of alarms the same as the multiple alarms; and
create a notification that the predicted cause is inaccurate.

20. At least one non-transitory computer-readable storage medium storing instructions to identify a technical issue associated with a wireless telecommunication network, which, when executed by at least one data processor of a system, cause the system to:
receive multiple alarms associated with the technical issue in the wireless telecommunication network, wherein an alarm among the multiple alarms is from a component in the wireless telecommunication network;
determine a category code for each of the multiple alarms, wherein the category code is selected from a set of categories,
  wherein the set of categories includes at least eight of the following categories: administrative, antenna, battery, clock, environmental, hardware, fire, performance, power, radio, regulatory, radio frequency, security, software, synchronization or transport;
create a correlation signature to identify the technical issue based on the multiple alarms,
  wherein the correlation signature includes at least three different category codes; and
  wherein the at least three different category codes in the correlation signature are arranged chronologically based on when each of the multiple alarms were received.

* * * * *